(12) United States Patent
Dar et al.

(10) Patent No.: US 12,474,839 B2
(45) Date of Patent: Nov. 18, 2025

(54) SYSTEM AND METHOD FOR CALIBRATING HETEROGENOUS WORKLOADS IN A MACHINE LEARNING MODEL FOR STORAGE OBJECTS

(71) Applicant: Dell Products L.P., Round Rock, TX (US)

(72) Inventors: Shaul Dar, Petach Tikva (IL); Ramakanth Kanagovi, Bengaluru (IN); Guhesh Swaminathan, Tamil Nadu (IN); Rajan Kumar, Nawada (IN)

(73) Assignee: Dell Products L.P., Round Rock, TX (US)

( * ) Notice: Subject to any disclaimer, the term of this patent is extended or adjusted under 35 U.S.C. 154(b) by 135 days.

(21) Appl. No.: 18/460,960

(22) Filed: Sep. 5, 2023

(65) Prior Publication Data
US 2025/0077081 A1   Mar. 6, 2025

(51) Int. Cl.
*G06F 3/06* (2006.01)

(52) U.S. Cl.
CPC .......... *G06F 3/0613* (2013.01); *G06F 3/0629* (2013.01); *G06F 3/0673* (2013.01)

(58) Field of Classification Search
CPC ..... G06F 3/0613; G06F 3/0673; G06F 3/0629
USPC ......................................................... 710/104
See application file for complete search history.

(56) References Cited

U.S. PATENT DOCUMENTS

| | | | |
|---|---|---|---|
| 8,402,238 B2 * | 3/2013 | Saito ..................... | G06F 3/0685 711/112 |
| 10,126,982 B1 * | 11/2018 | Colgrove ............ | G06F 11/1076 |
| 10,528,257 B2 * | 1/2020 | Gao ...................... | G06F 3/0653 |
| 11,354,061 B2 * | 6/2022 | Prado ................... | G06F 3/0611 |
| 11,392,315 B1 * | 7/2022 | Cady ................... | H04L 41/5067 |
| 2014/0258647 A1 * | 9/2014 | Maruyama ........... | G06F 3/0653 711/154 |
| 2018/0067659 A1 * | 3/2018 | Nagata ................. | G06F 3/0611 |
| 2019/0171368 A1 * | 6/2019 | Chen .................... | G06F 3/0613 |
| 2020/0278799 A1 * | 9/2020 | Kumar .................. | G06F 3/0673 |
| 2023/0036528 A1 * | 2/2023 | Vankamamidi ......... | G06F 3/067 |

* cited by examiner

*Primary Examiner* — Christopher B Shin
(74) *Attorney, Agent, or Firm* — Brian J. Colandreo; Heath M. Sargeant; Holland & Knight LLP

(57) ABSTRACT

A method, computer program product, and computing system for processing a plurality of input/output (IO) requests associated with a storage object in a storage system. A plurality of IO features are generated using the plurality of IO requests associated with the storage object. A time dependent IO feature is identified from the plurality of IO features. A coefficient for the time dependent IO feature for the storage system is extracted. The time dependent IO feature is calibrated using the coefficient for the time dependent IO feature for the storage system relative to the time dependent IO feature from at least one other storage system.

20 Claims, 5 Drawing Sheets

SYSTEM AND METHOD FOR CALIBRATING HETEROGENOUS WORKLOADS IN A MACHINE LEARNING MODEL FOR STORAGE OBJECTS

BACKGROUND

The ability to model and characterize the input/output (IO) activity of objects such as files, volumes, or extents, in a storage system, can enable many specialized optimizations and significant performance gains. For example, domain-specific machine learning (ML) models can enable better tiering and caching in a storage array and assist in load balancing across a storage cluster, and that it can also be leveraged to detect security threats such as a ransomware attack. This approach involves generating succinct traces of the I/O operations occurring in the system, using them to engineer domain-specific I/O-stream features, and then training a classification or regression model based on these features for the particular task at hand.

This ML-based technology requires large and high-quality training sets that must be extracted from many workloads executed on a variety of storage systems. These storage systems can have very different performance characteristics due to factors such as model, hardware (including speed and/or size of processors, memory, disks and other peripherals), software version, configuration, system occupancy and utilization, etc. Thus when traces are collected from such heterogenous systems, the raw performance data and the feature values engineered from it can be very different, and cannot simply be combined into one training set upon which a single unified ML model can be built. Similarly, when performing inference on a particular system the feature values may be (statistically) significantly different from the range of values for the same features in the training set used for building the model.

SUMMARY OF DISCLOSURE

In one example implementation, a computer-implemented method executed on a computing device may include, but is not limited to, processing a plurality of input/output (IO) requests associated with a storage object in a storage system. A plurality of IO features are generated using the plurality of IO requests associated with the storage object. A time dependent IO feature is identified from the plurality of IO features. A coefficient for the time dependent IO feature for the storage system is extracted. The time dependent IO feature is calibrated using the coefficient for the time dependent IO feature for the storage system relative to the time dependent IO feature from at least one other storage system.

One or more of the following example features may be included. Processing the plurality of IO requests associated with the storage object may include processing a plurality of IO requests from a standard benchmark defining a plurality of standard IO requests for processing on a plurality of storage systems. A time independent feature is identified from the plurality of IO features. The time dependent feature may include one or more of: an IO rate feature; and an IO interval feature. The IO rate feature may include one or more of: a bandwidth per unit time; a read bandwidth per unit time; a write bandwidth per unit time; a rate of input/output requests per unit time; a rate of read input/output requests per unit time; and a rate of write input/output requests per unit time. The IO interval feature may include one or more of: an average number of time consecutive IO requests; an average number of time consecutive IO read requests; an average number of time consecutive IO write requests; an average number of time consecutive IO read-write request pairs; and an average number of time consecutive IO write-read request pairs. Extracting a coefficient for the time dependent IO feature for the storage system may include processing a plurality of extracted coefficients for the time dependent IO feature from a plurality of storage systems. Calibrating the time dependent IO feature using the coefficient for the time dependent IO feature for the storage system may include calibrating the time dependent IO feature for the storage system based upon, at least in part, the plurality of extracted coefficients for the time dependent IO feature from the plurality of storage systems.

In another example implementation, a computer program product resides on a computer readable medium that has a plurality of instructions stored on it. When executed by a processor, the instructions cause the processor to perform operations that may include, but are not limited to, processing a plurality of input/output (IO) requests associated with a storage object in a storage system. A plurality of IO features are generated using the plurality of IO requests associated with the storage object. A time dependent IO feature is identified from the plurality of IO features. A coefficient for the time dependent IO feature for the storage system is extracted. The time dependent IO feature is calibrated using the coefficient for the time dependent IO feature for the storage system relative to the time dependent IO feature from at least one other storage system.

One or more of the following example features may be included. Processing the plurality of IO requests associated with the storage object may include processing a plurality of IO requests from a standard benchmark defining a plurality of standard IO requests for processing on a plurality of storage systems. A time independent feature is identified from the plurality of IO features. The time dependent feature may include one or more of: an IO rate feature; and an IO interval feature. The IO rate feature may include one or more of: a bandwidth per unit time; a read bandwidth per unit time; a write bandwidth per unit time; a rate of input/output requests per unit time; a rate of read input/output requests per unit time; and a rate of write input/output requests per unit time. The IO interval feature may include one or more of: an average number of time consecutive IO requests; an average number of time consecutive IO read requests; an average number of time consecutive IO write requests; an average number of time consecutive IO read-write request pairs; and an average number of time consecutive IO write-read request pairs. Extracting a coefficient for the time dependent IO feature for the storage system may include processing a plurality of extracted coefficients for the time dependent IO feature from a plurality of storage systems. Calibrating the time dependent IO feature using the coefficient for the time dependent IO feature for the storage system may include calibrating the time dependent IO feature for the storage system based upon, at least in part, the plurality of extracted coefficients for the time dependent IO feature from the plurality of storage systems.

In another example implementation, a computing system includes at least one processor and at least one memory architecture coupled with the at least one processor, wherein the at least one processor is configured to process a plurality of input/output (IO) requests associated with a storage object in a storage system. A plurality of IO features are generated using the plurality of IO requests associated with the storage object. A time dependent IO feature is identified from the plurality of IO features. A coefficient for the time dependent IO feature for the storage system is extracted. The time dependent IO feature is calibrated using the coefficient for the time dependent IO feature for the storage system relative to the time dependent IO feature from at least one other storage system.

One or more of the following example features may be included. Processing the plurality of IO requests associated with the storage object may include processing a plurality of IO requests from a standard benchmark defining a plurality of standard IO requests for processing on a plurality of storage systems. A time independent feature is identified from the plurality of IO features. The time dependent feature may include one or more of: an IO rate feature; and an IO interval feature. The IO rate feature may include one or more of: a bandwidth per unit time; a read bandwidth per unit time; a write bandwidth per unit time; a rate of input/output requests per unit time; a rate of read input/output requests per unit time; and a rate of write input/output requests per unit time. The IO interval feature may include one or more of: an average number of time consecutive IO requests; an average number of time consecutive IO read requests; an average number of time consecutive IO write requests; an average number of time consecutive IO read-write request pairs; and an average number of time consecutive IO write-read request pairs. Extracting a coefficient for the time dependent IO feature for the storage system may include processing a plurality of extracted coefficients for the time dependent IO feature from a plurality of storage systems. Calibrating the time dependent IO feature using the coefficient for the time dependent IO feature for the storage system may include calibrating the time dependent IO feature for the storage system based upon, at least in part, the plurality of extracted coefficients for the time dependent IO feature from the plurality of storage systems.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
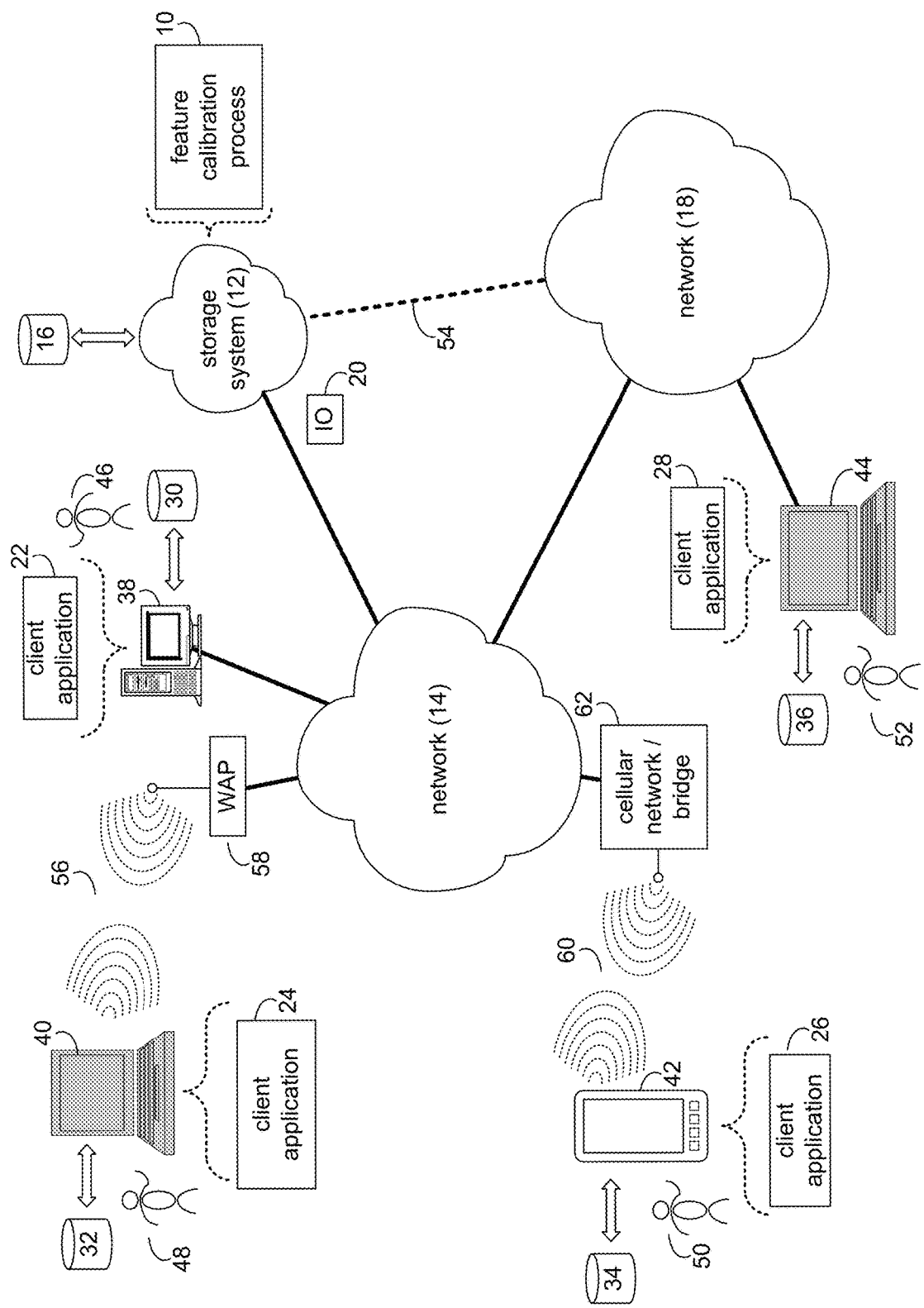
FIG. 1 is an example diagrammatic view of a storage system and a feature calibration process coupled to a distributed computing network according to one or more example implementations of the disclosure.

Referring to FIG. 1, there is shown feature calibration process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of feature calibration process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of feature calibration process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network

18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a feature calibration process, such as feature calibration process 10 of FIG. 1, may include but is not limited to, processing a plurality of input/output (IO) requests associated with a storage object in a storage system. A plurality of IO features are generated using the plurality of IO requests associated with the storage object. A time dependent IO feature is identified from the plurality of IO features. A coefficient for the time dependent IO feature for the storage system is extracted. The time dependent IO feature is calibrated using the coefficient for the time dependent IO feature for the storage system relative to the time dependent IO feature from at least one other storage system.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
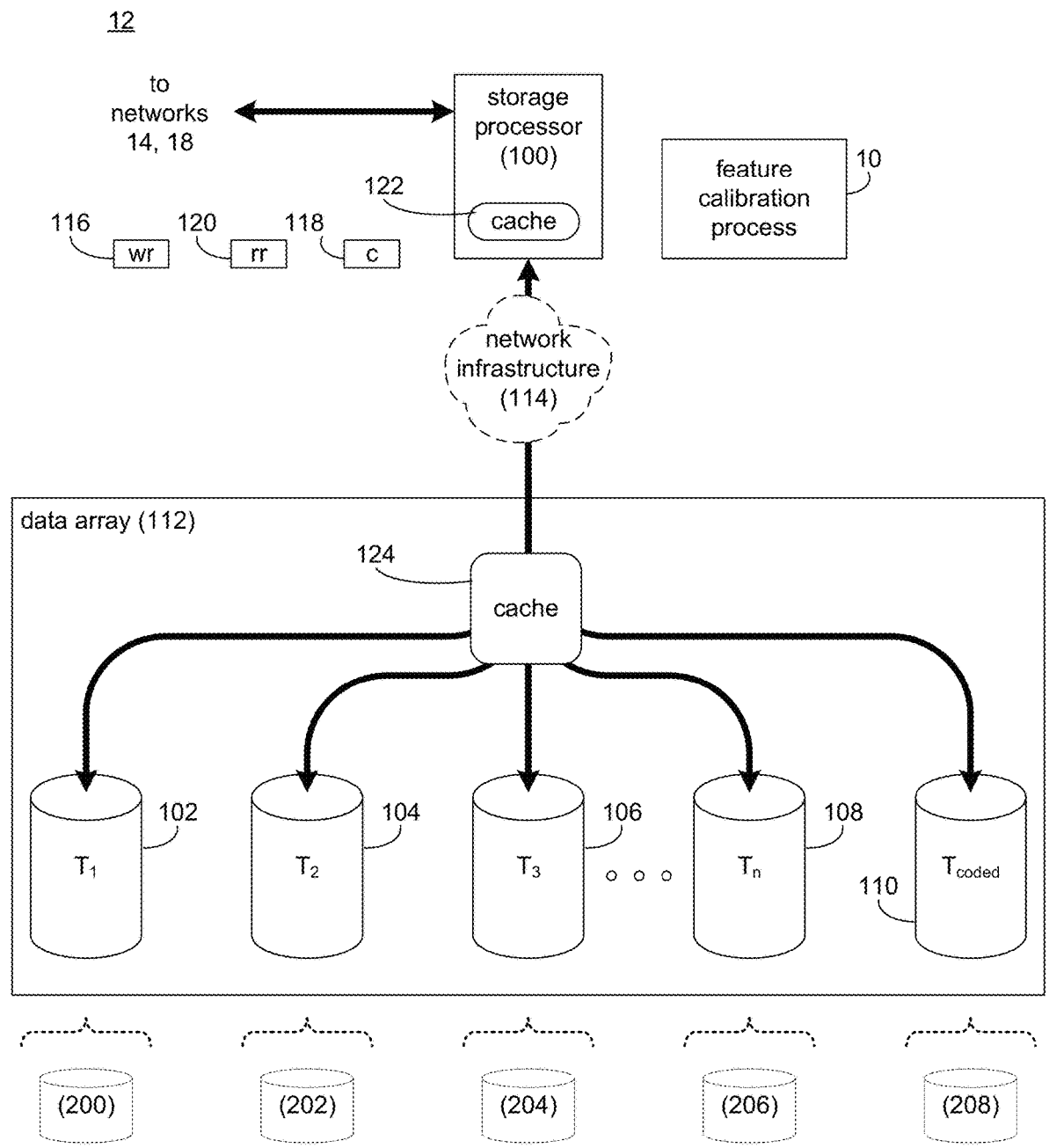
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-*n* (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of feature calibration process 10. The instruction sets and subroutines of feature calibration process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive;

a tape drive; an optical drive; a RAID device; a random access memory (RAM); a read-only memory (ROM); and all forms of flash memory storage devices. As discussed above, some portions of the instruction sets and subroutines of feature calibration process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of feature calibration process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of feature calibration process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

Figure 3:
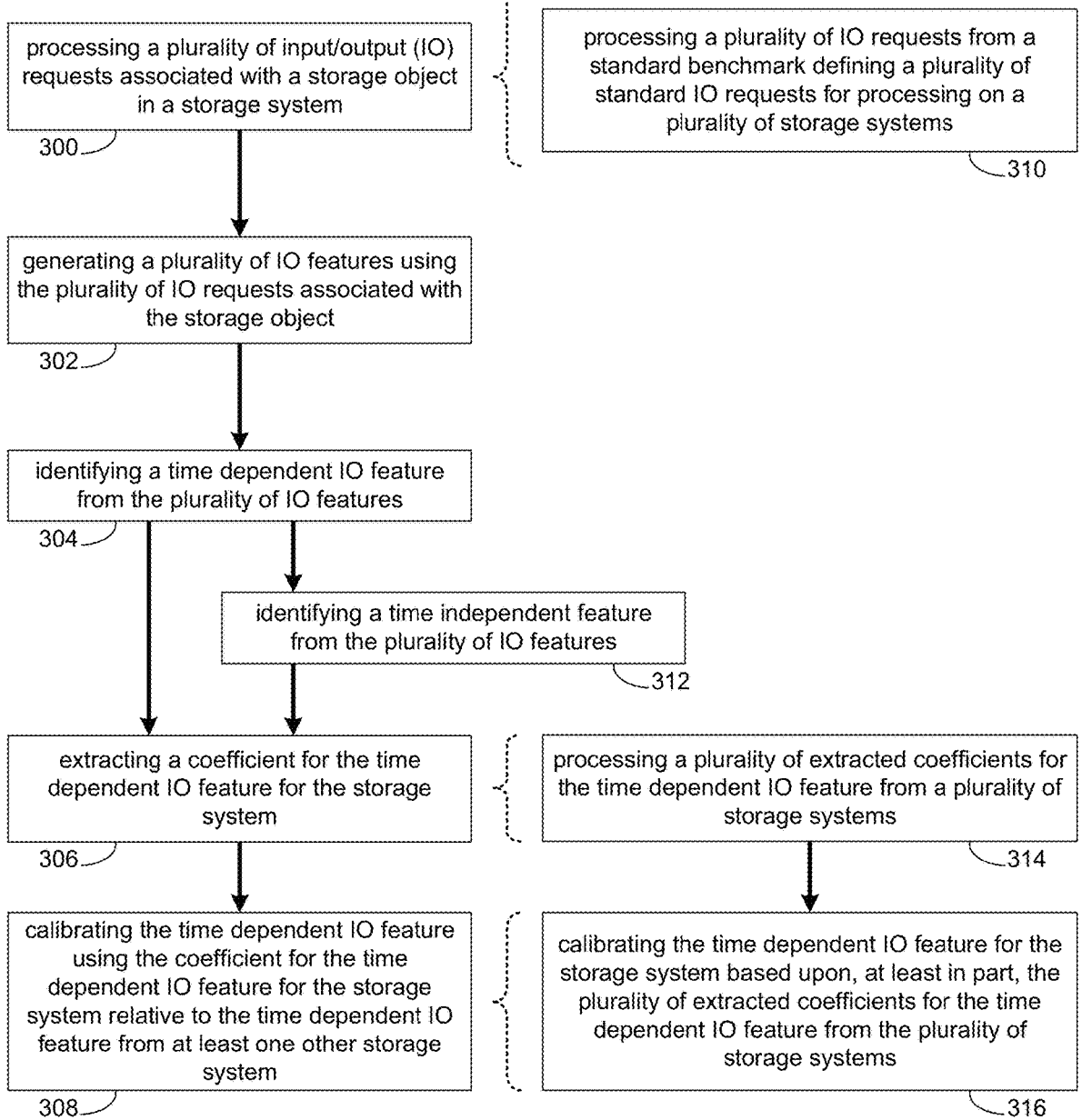
FIG. 3 is an example flowchart of feature calibration process according to one or more example implementations of the disclosure.
Figure 4:
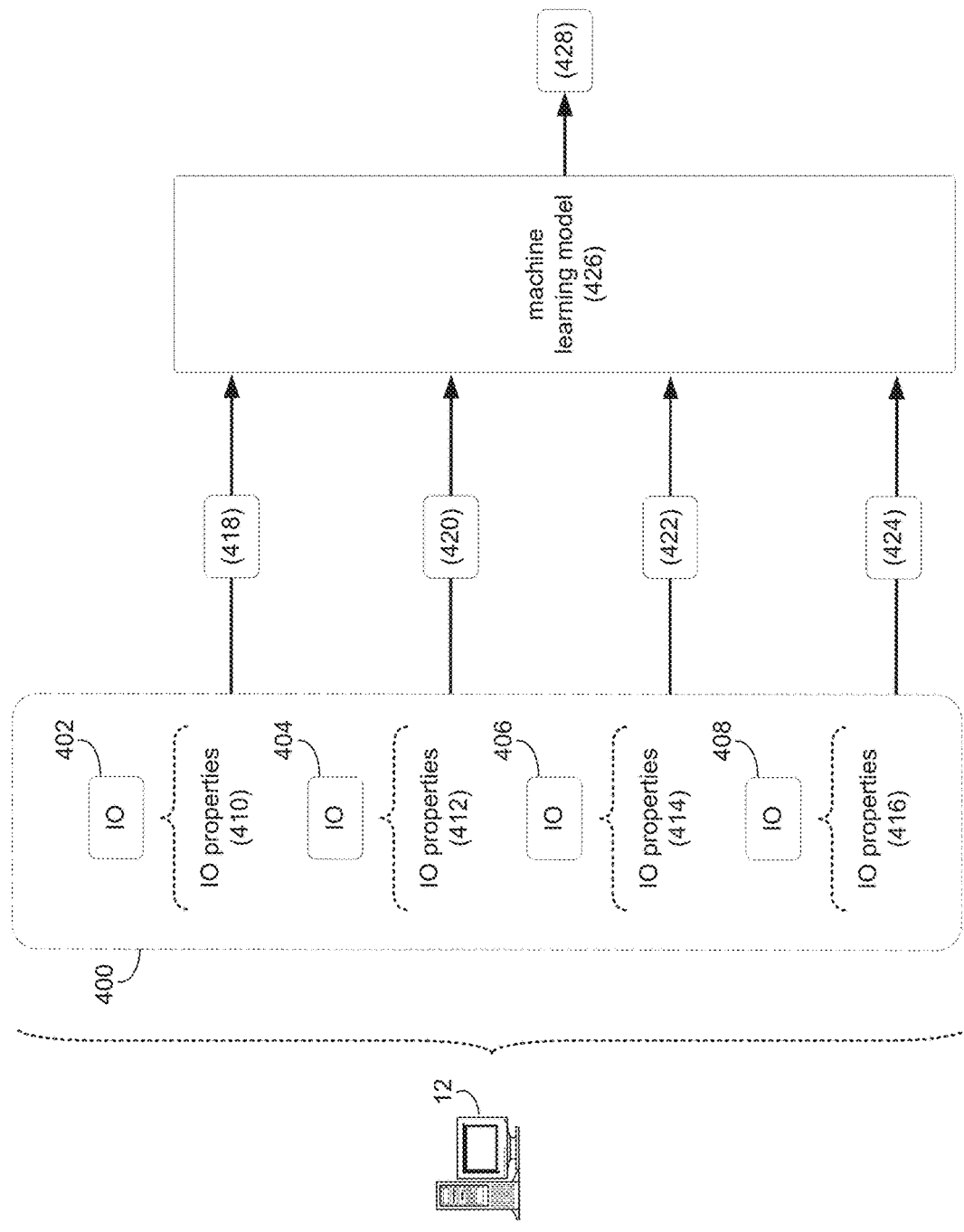
FIGS. 4-5 are example diagrammatic views of the feature calibration process according to various example implementations of the disclosure.
Figure 5:
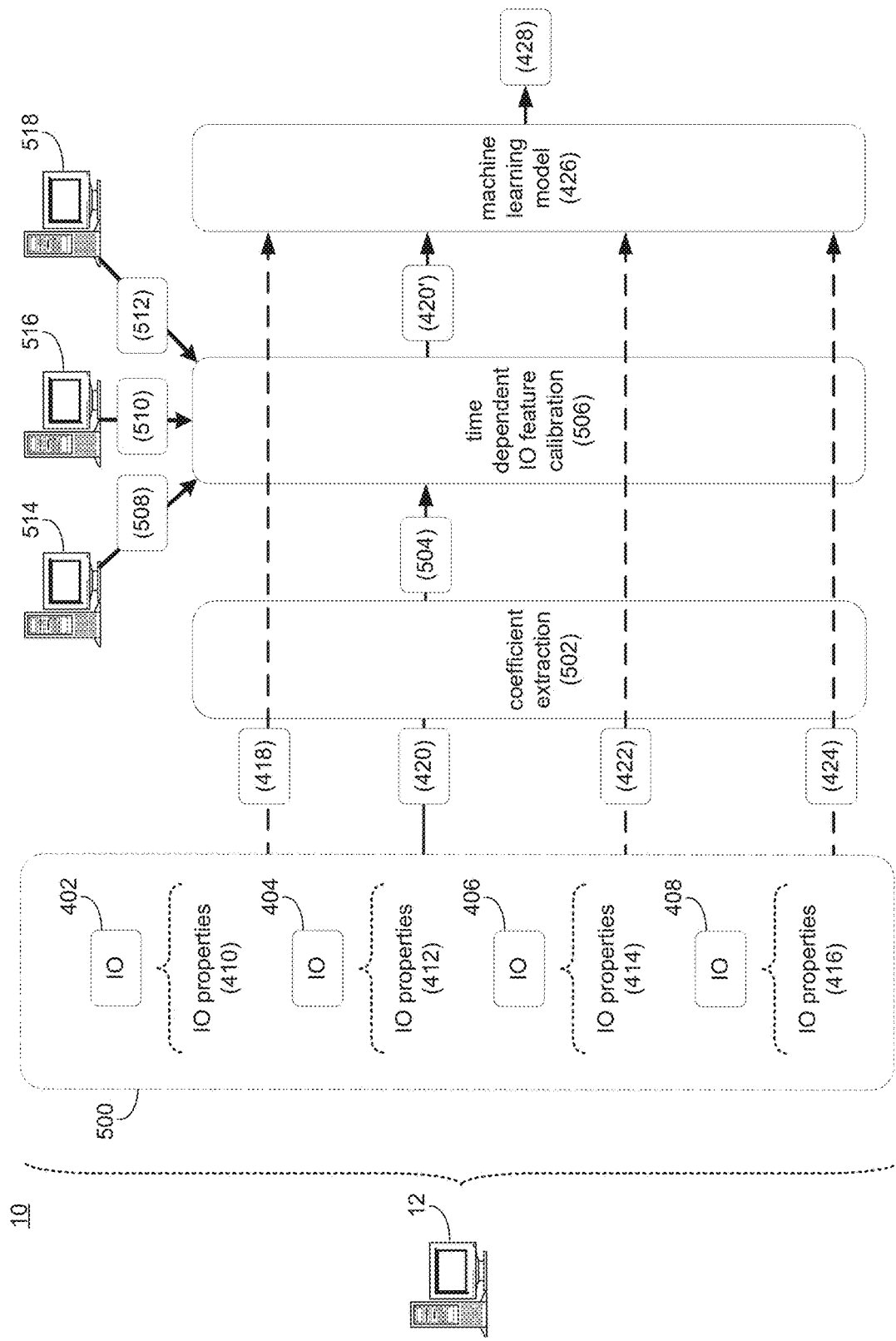

The Feature Calibration Process:

Referring also to the examples of FIGS. 3-5 and in some implementations, feature calibration process 10 may process 300 a plurality of input/output (IO) requests associated with a storage object in a storage system. A plurality of IO features are generated 302 using the plurality of IO requests associated with the storage object. A time dependent IO feature is identified 304 from the plurality of IO features. A coefficient for the time dependent IO feature for the storage system is extracted 306. The time dependent IO feature is calibrated 308 using the coefficient for the time dependent IO feature for the storage system relative to the time dependent IO feature from at least one other storage system.

As will be discussed in greater detail below, implementations of the present disclosure may allow for automated calibration of time dependent IO features using a standard benchmark methodology. As discussed above, machine learning-based technology requires large and high-quality training sets that must be extracted from many workloads executed on a variety of storage systems. These storage systems can have very different performance characteristics due to factors such as model, hardware (including speed and/or size of processors, memory, disks and other peripherals), software version, configuration, system occupancy and utilization, etc. Thus when traces are collected from such heterogenous systems, the raw performance data and the feature values engineered from it can be very different, and cannot simply be combined into one training set upon which a single unified ML model can be built. Similarly, when performing inference on a particular system the feature values may be (statistically) significantly different from the range of values for the same features in the training set used for building the model. Accordingly, implementations of the present disclosure can resolve these discrepancies by applying a standard benchmark to calibrate time dependent IO features for each storage system when compared to other storage systems.

In some implementations, feature calibration process 10 processes 300 a plurality of input/output (IO) requests associated with a storage object in a storage system. For example, processing 300 a plurality of input/output (IO) requests associated with the storage object may include generating 302 a plurality of IO features using the plurality of IO requests. For example and referring again to FIG. 2, during the operation of a storage system (e.g., storage system 12), IO operations may be generated for processing data on various storage objects (e.g., storage objects 200, 202, 204, 206, 208). Storage objects (e.g., storage objects 200, 202, 204, 206, 208) may generally include any container or storage unit configured to store data within a storage system (e.g., storage system 12). For example, a storage object may be any one of the following: a volume (aka Logical Unit Number (LUN)), a file, or parts thereof that may be defined e.g. by offsets or address ranges (e.g., sub-LUNs, disk extents, and/or slices). In some implementations, the plurality of storage objects include a block storage object and/or a file storage object. A block storage object is a block or chunk of storage that can be accessed by various operating systems. In some implementations, a file storage object is a folder or subset of a hierarchical data structure accessible by a particular path within the hierarchical data structure.

Referring also to FIG. 4, a plurality of IO requests (e.g., plurality of IO requests 400) may include e.g., four IO requests associated with various storage objects and/or the same storage object. IO request 402 may include a request to perform a read IO operation on a first storage object (e.g., storage object 200); IO request 404 may include a request to perform a write IO operation on storage object 200; IO request 406 may include a request to perform a read IO operation on storage object 200; and IO request 408 may include a request to perform an operation on storage object 200. While four separate IO requests for a single storage object have been described, it will be appreciated that this is for example purposes only and that any number of IO requests may be received for any number of storage objects within the present disclosure.

In some implementations, feature calibration process 10 generates 302 a plurality of IO features using the plurality of IO requests. An IO feature is a representation of a plurality of IO properties associated with a particular storage object over a period of time. Examples of IO features include a number of IO requests per second (IOPS); a total number of read IO requests; a total number of write IO requests; a percentage of sequential read IO requests; a percentage of sequential write IO requests; an average length of read IO requests; an average length of write IO requests; a standard deviation in read IO request length; a standard deviation in write IO request length; an average arrival rate of any IO request; an average arrival rate for read IO requests; an average arrival rate for write IO requests; an average difference in logical block address (LBA) between IO requests; an average difference in LBA between consecutive read IO requests; an average difference in logical block address (LBA) between consecutive write IO requests; etc.

In some implementations, feature calibration process 10 generates the plurality of IO features by extracting salient data elements (e.g., one or more IO properties) such as volume ID, timestamp, IO command type (e.g. read, write, unmap, etc.), logical block address (LBA) (i.e., an offset in the data path's thin address space), length, pattern (e.g., sequential, random, caterpillar, IO-stride), etc. from the plurality of IO requests. In this manner, feature calibration process 10 may extract various IO properties associated with the plurality of IO requests. Referring again to FIG. 4 and in some implementations, feature calibration process 10 may extract one or more IO properties from plurality of IO requests 400. For example, feature calibration process 10 may extract IO properties 410 from IO request 402; IO properties 412 from IO request 404; IO properties 414 from IO request 406; and IO properties 416 from IO request 408.

In some implementations, generating 302 the plurality of IO features using the plurality of IO requests includes aggregating the plurality of IO requests periodically, and generating the plurality of IO features using the aggregated plurality of IO requests. For example, feature calibration process 10 may aggregate the one or more IO properties periodically to optimize for memory/storage requirements and/or CPU costs. Additionally, feature calibration process 10 may use a sampling approach where IO properties for every "n"th IO request are extracted. In some implementations, the number of IO requests between extracting the one or more IO properties may be user-defined, a default number of IO requests, and/or defined automatically by feature calibration process 10. In this manner, feature calibration process 10 may limit the amount of processing of IO requests to generate IO features by sampling and aggregating a limited set of all of the IO requests received at the storage system. Referring again to FIG. 4 and in some implementations, feature calibration process 10 may aggregate IO properties 410 from IO request 402; IO properties 412 from IO request 404; IO properties 414 from IO request 406; and IO properties 416 from IO request 408 and generate 310 a plurality of IO features (e.g., IO features 418, 420, 422, 424).

In some implementations, feature calibration process 10 processes the plurality of IO features using a machine learning model. A machine learning model may generally include an algorithm or combination of algorithms that has been trained to recognize certain types of patterns. For example, machine learning approaches may be generally divided into three categories, depending on the nature of the signal available: supervised learning, unsupervised learning, and reinforcement learning. Supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). Reinforcement learning may generally include a computing device interacting in a dynamic environment in which it must perform a certain goal (such as driving a vehicle or playing a game against an opponent). As it navigates its problem space, the machine learning model is provided feedback that is analogous to rewards, which it tries to maximize. While three examples of machine learning approaches have been provided, it will be appreciated that other machine learning approaches are possible within the scope of the present disclosure. In one example, a random-forest machine learning model may be used due to its generality, simplicity, tunability, and ability to cope with over-fitting. However, it will be appreciated that various machine learning models may be used within the scope of the present disclosure to process 304 the plurality of IO features. Referring again to FIG. 4 and in some implementations, feature calibration process 10 may process the plurality of IO features (e.g., IO features 418, 420, 422, 424) using a machine learning model (e.g., machine learning model 426).

In some implementations, the machine learning model may be used for regression. For example, ensemble methods such as Random Forrest (a collection of decision trees) may be candidates for these machine learning models because of their simplicity, speed, and lower risk of overfitting. However, it will be appreciated that the one or more machine learning models may utilize various types of machine learning algorithms for processing the one or more IO features for one or more storage objects of the storage system within the scope of the present disclosure.

In some implementations, the one or more machine learning models may be configured for one or more of: offline training and continuous training. Offline training may generally include a one-time or single training of the one or more machine learning models with training data that is performed separately from the processing of non-training data. Continuous training may generally include changing or updating the one or more machine learning models data comes in, e.g. with every "n" th IO request. Feature calibration process 10 may also guide the training process to acquire more useful data using active learning. For example, feature calibration process 10 can sample with higher frequency the storage objects in which the quality of the current is low.

In some implementations, machine learning model 426 may be configured or trained to generate a prediction or classification (e.g., result 428) based upon, at least in part, the plurality of IO features. Examples of these predictions (e.g., result 428) include forecast temperatures for the likelihood that a storage object will be accessed within a particular window of time, a classification of a storage object into one of many classes or groups, a prediction of whether a storage object is subject to a ransomware attack, etc. As will be discussed in greater detail below, machine learning model 426 may be trained with training data. However, that training data may be skewed or biased by the processing performance of specific storage systems when generating time dependent IO features. Accordingly, feature calibration process 10 may calibrate coefficients for time dependent IO features to account for differences in storage system configuration.

In some implementations, processing 300 the plurality of IO requests associated with the storage object may include processing 310 a plurality of IO requests from a standard benchmark defining a plurality of standard IO requests for processing on a plurality of storage systems. For example and referring also to FIG. 5, feature calibration process 10 may provide a standard benchmark (e.g., standard benchmark 500) of IO requests (e.g., IO requests 402, 404, 406, 408) for processing on a plurality of storage systems. In some implementations, standard benchmark 500 includes a plurality of IO requests (e.g., IO requests 402, 404, 406, 408) that test different types or distributions of IO requests. For example, standard benchmark 500 may include a workload that represents a realistic mix of IO activities on a storage system, and is not biased e.g., to only reads or writes, sequential vs. random IO requests, small vs. large size IO requests, etc. In one example, standard benchmark 500 includes an industry standard benchmark such as those formulated by the storage performance council, the Storage Networking Industry Association (SNIA), and/or a particular vendor's standard benchmark for use on their respective storage systems. In another example and in the absence of a formalized standard benchmark, feature calibration process 10 may use traces collected in the past without knowledge of the system configuration to generate the average IO feature values across all the workloads for each system to calibrate the values for that system. However, this approach may be subject to lower reliability based on the average of the past IO features.

In some implementations, feature calibration process 10 identifies 304 a time dependent IO feature from the plurality of IO features. A time dependent IO feature is an IO feature that varies with the processing capacity of a storage system. For example, the values of time dependent features may differ when the same workload is executed on different storage systems. In general, it is expected that on a "slower" storage system (e.g., a weaker model or highly-loaded storage system), the values of rates (e.g., IO rate features) may be lower and the value of time intervals (e.g., interval IO features) may be higher. In contrast, it is expected that on a "faster" storage system (e.g., a higher performance model or a lightly-loaded storage system), the values of rates (e.g., IO rate features) may be higher and the value of time intervals (e.g., interval IO features) may be lower.

In some implementations, the time dependent feature includes one or more of: an IO rate feature and an IO interval feature. For example, an IO rate feature is a feature that represents a measured rate of IO requests processed over a particular period of time. For example, the IO rate feature includes one or more of: a bandwidth per unit time, a read bandwidth per unit time, a write bandwidth per unit time, a rate of input/output requests per unit time, a rate of read input/output requests per unit time, and a rate of write input/output requests per unit time. An IO interval feature is a feature that represents a measured number or sequence of IO requests over a particular duration (e.g., duration of individual IO requests, numbers of consecutive IO requests, etc.). For example, the IO interval feature may include one or more of: an average number of time consecutive IO requests, an average number of time consecutive IO read requests, an average number of time consecutive IO write requests, an average number of time consecutive IO read-write request pairs, and an average number of time consecutive IO write-read request pairs.

In some implementations, feature calibration process 10 identifies 312 a time independent feature from the plurality of IO features. However, the values of time independent features (e.g., a percentage of reads, or length difference between consecutive reads) should be the same on each storage system since it is determined only by the sequence of operations in the workload running on the host, and is agnostic to the speed of the execution, including interleaving of operations from different workloads or different hosts.

Referring again to FIG. 5, processing standard benchmark 500 may include processing a plurality IO requests (e.g., IO requests 402, 404, 406, 408). In response to processing 300 plurality of IO requests 402, 404, 406, 408, feature calibration process 10 generates 302 a plurality of IO features (e.g., plurality of IO features 418, 420, 422, 424). In some implementations, feature calibration process 10 identifies 304 one or more time dependent features (e.g., time dependent feature 420) and one or more time independent features (e.g., time independent features 418, 422, 424). For example, feature calibration process 10 may compare the plurality of IO features (e.g., plurality of IO features 418, 420, 422, 424) against a database of IO feature types to identify 304 the time dependent features and the time independent features. In this example, suppose that IO feature 420 is a write bandwidth per unit time (e.g., write bandwidth per second). As discussed above, as plurality of IO requests 402, 404, 406, 408 are being processed on storage system 12, IO feature 420 may be dependent upon the processing capacity of storage system 12. As will be discussed in greater detail below, feature calibration process 10 may calibrate IO feature 420 relative to the time dependent IO feature from other storage systems. In this manner, processing of the plurality of features using a machine learning model (e.g., temperature forecasting, automated tiering, ransomware detection, etc.) can be generalized over different storage system configurations. That is, training data used to train machine learning model 426 from one storage system configuration may be used for other storage systems by calibrating the time dependent IO features for other storage systems. Accordingly, feature calibration process 10 allows a single machine learning model to be used to process IO features from various storage systems with unique configurations.

In some implementations, feature calibration process 10 extracts 306 a coefficient for the time dependent IO feature for the storage system. A coefficient for the time dependent IO feature is a numerical representation of the value of an IO feature. For example, extracting 306 of a coefficient (e.g., coefficient 504) for IO feature 420 may be represented by coefficient extraction 502 as shown in FIG. 5. In one example, suppose that IO feature 420 is a write bandwidth per second (in 512 byte units). In this example, feature calibration process 10 may extract 306 a coefficient for IO feature 420 as the bandwidth per second (e.g., 5,816.8). As will be discussed in greater detail below, this coefficient is unique to storage system 12 and may be calibrated by feature calibration process 10 to allow machine learning model 426 to process the plurality of IO features across different types of storage systems with a limited training set (e.g., without requiring training data including time dependent IO features from each storage system configuration).

In some implementations, extracting 306 a coefficient for the time dependent IO feature for the storage system may include processing 314 a plurality of extracted coefficients for the time dependent IO feature from a plurality of storage systems. For example, feature calibration process 10 may use the coefficients for the same time dependent IO feature from a plurality of storage systems. Referring again to FIG. 5, feature calibration process 10 may process 314 a plurality of coefficients (e.g., coefficients 508, 510, 512) extracted from a plurality of storage systems (e.g., storage systems 514, 516, 518). In this example, coefficient 508 is a write bandwidth per unit time extracted from IO feature 420 generated for storage system 514; coefficient 510 is a write bandwidth per unit time extracted from IO feature 420 generated for storage system 516; and coefficient 512 is a write bandwidth per unit time extracted from IO feature 420 generated for storage system 518. Continuing with this example, suppose feature calibration process 10 processes 314 extracted coefficients for IO feature 420 as shown below in Table 1:

| | storage system 12 | storage system 514 | storage system 516 | storage system 518 |
|---|---|---|---|---|
| IO feature 420 (write bandwidth per second) | 5,816.8 | 5,324.8 | 10,611.1 | 9,192.3 |

As shown above in Table 1, the write bandwidth per second varies significantly between storage systems 12, 514, 516, and 518.

In some implementations, feature calibration process 10 calibrates 308 the time dependent IO feature using the coefficient for the time dependent IO feature for the storage system relative to the time dependent IO feature from at least one other storage system. Calibrating the time dependent IO feature may generally include normalizing the coefficient for the time dependent IO feature relative to the time dependent IO feature from at least one other storage system. In one example, feature calibration process 10 calibrates 308 the time dependent IO feature by determining an average coefficient for the time dependent IO feature and dividing the average coefficient by the coefficient for the time dependent IO feature. In this manner, feature calibration process 10 calibrates 308 the time dependent IO feature by compensating for the difference between the coefficient and the average coefficient for the time dependent IO feature. In one example, the average coefficient for the time dependent IO feature is a predefined value. In another example, the average coefficient for the time dependent IO feature is calculated as the average value for the coefficient for the time dependent IO feature. However, it will be appreciated that the average coefficient may be determined in various manners within the scope of the present disclosure.

In some implementations, calibrating 308 the time dependent IO feature using the coefficient for the time dependent IO feature for the storage system may include calibrating 316 the time dependent IO feature for the storage system based upon, at least in part, the plurality of extracted coefficients for the time dependent IO feature from the plurality of storage systems. For example, suppose that feature calibration process 10 determines the average coefficient value for the plurality of extracted coefficients for the time dependent IO feature (e.g., IO feature 420) as 7,736.25. In this example, feature calibration process 10 calibrates 316 for storage system 12 by multiplying coefficient 420 by the quotient of 1.32 by dividing the average coefficient (e.g., 7,736.25) by the extracted coefficient (e.g., coefficient 504). In this manner, feature calibration process 10 allows training data associated with storage systems 514, 516, and/or 518 to be used to train machine learning model 426 such that any distinctions can be resolved by calibrating the plurality of IO features from a particular storage system. Returning to the example of FIG. 5, feature calibration process 10 may calibrate 316 coefficient 504 to generate a calibrated IO feature (e.g., IO feature 420'). In this manner, feature calibration process 10 allows the resulting calibrated coefficient for the IO feature (e.g., IO feature 420') to be processed by machine learning model 426.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    processing, via the computing device, a plurality of input/output (IO) requests associated with a storage object in a storage system;
    generating, via the computing device, a plurality of IO features using the plurality of IO requests associated with the storage object;
    identifying, via the computing device, a time dependent IO feature for the storage system from the plurality of IO features;
    extracting, via the computing device, a coefficient for the time dependent IO feature for the storage system, wherein the coefficient is numerical representation of a value of the time dependent IO feature;
    generating, via the computing device, a calibrated time dependent IO feature for the storage system by calibrating, via the computing device, the time dependent IO feature using the coefficient for the time dependent IO feature for the storage system relative to a corresponding time dependent IO feature from at least one other storage system, wherein calibrating the time dependent IO feature includes normalizing the coefficient for the time dependent IO feature for the storage system relative to the time dependent IO feature from at least one other storage system; and
    processing, via the computing device, the calibrated time dependent IO feature for the storage system using a machine learning model trained using training data associated with the at least one other storage system.

2. The computer-implemented method of claim 1, wherein processing the plurality of IO requests associated with the storage object includes processing a plurality of IO requests from a standard benchmark defining a plurality of standard IO requests for processing on a plurality of storage systems.

3. The computer-implemented method of claim 1, further comprising:
identifying a time independent feature from the plurality of IO features.

4. The computer-implemented method of claim 1, wherein the time dependent feature includes one or more of:
an IO rate feature; and
an IO interval feature.

5. The computer-implemented method of claim 4, wherein the IO rate feature includes one or more of:
a bandwidth per unit time;
a read bandwidth per unit time;
a write bandwidth per unit time;
a rate of input/output requests per unit time;
a rate of read input/output requests per unit time; and
a rate of write input/output requests per unit time.

6. The computer-implemented method of claim 4, wherein the IO interval feature includes one or more of:
an average number of time consecutive IO requests;
an average number of time consecutive IO read requests;
an average number of time consecutive IO write requests;
an average number of time consecutive IO read-write request pairs; and
an average number of time consecutive IO write-read request pairs.

7. The computer-implemented method of claim 1, wherein extracting a coefficient for the time dependent IO feature for the storage system includes processing a plurality of extracted coefficients for the time dependent IO feature from a plurality of storage systems.

8. The computer-implemented method of claim 7, wherein calibrating the time dependent IO feature using the coefficient for the time dependent IO feature for the storage system includes calibrating the time dependent IO feature for the storage system based upon, at least in part, the plurality of extracted coefficients for the time dependent IO feature from the plurality of storage systems.

9. A computer program product residing on a non-transitory computer readable medium having a plurality of instructions stored thereon which, when executed by a processor, cause the processor to perform operations comprising:
processing a plurality of input/output (IO) requests associated with a storage object in a storage system;
generating a plurality of IO features using the plurality of IO requests associated with the storage object;
identifying a time dependent IO feature from the plurality of IO features;
extracting a coefficient for the time dependent IO feature for the storage system, wherein the coefficient is numerical representation of a value of the time dependent IO feature;
generating a calibrated time dependent IO feature for the storage system by calibrating, via the computing device, the time dependent IO feature using the coefficient for the time dependent IO feature for the storage system relative to a corresponding time dependent IO feature from at least one other storage system, wherein calibrating the time dependent IO feature includes normalizing the coefficient for the time dependent IO feature for the storage system relative to the time dependent IO feature from at least one other storage system; and
processing the calibrated time dependent IO feature for the storage system using a machine learning model trained using training data associated with the at least one other storage system.

10. The computer program product of claim 9, wherein processing the plurality of IO requests associated with the storage object includes processing a plurality of IO requests from a standard benchmark defining a plurality of standard IO requests for processing on a plurality of storage systems.

11. The computer program product of claim 9, wherein the operations further comprise:
identifying a time independent feature from the plurality of IO features.

12. The computer program product of claim 9, wherein the time dependent feature includes one or more of:
an IO rate feature; and
an IO interval feature.

13. The computer program product of claim 12, wherein the IO rate feature includes one or more of:
a bandwidth per unit time;
a read bandwidth per unit time;
a write bandwidth per unit time;
a rate of input/output requests per unit time;
a rate of read input/output requests per unit time; and
a rate of write input/output requests per unit time.

14. The computer program product of claim 12, wherein the IO interval feature includes one or more of:
an average number of time consecutive IO requests;
an average number of time consecutive IO read requests;
an average number of time consecutive IO write requests;
an average number of time consecutive IO read-write request pairs; and
an average number of time consecutive IO write-read request pairs.

15. The computer program product of claim 9, wherein extracting a coefficient for the time dependent IO feature for the storage system includes processing a plurality of extracted coefficients for the time dependent IO feature from a plurality of storage systems.

16. The computer program product of claim 15, wherein calibrating the time dependent IO feature using the coefficient for the time dependent IO feature for the storage system includes calibrating the time dependent IO feature for the storage system based upon, at least in part, the plurality of extracted coefficients for the time dependent IO feature from the plurality of storage systems.

17. A computing system comprising:
a memory; and
a processor configured to process a plurality of input/output (IO) requests associated with a storage object in a storage system, to generate a plurality of IO features using the plurality of IO requests associated with the storage object, to identify a time dependent IO feature from the plurality of IO features, to extract a coefficient for the time dependent IO feature for the storage system, wherein the coefficient is numerical representation of a value of the time dependent IO feature, to generate a calibrated time dependent IO feature for the storage system by calibrating the time dependent IO feature using the coefficient for the time dependent IO feature for the storage system relative to a corresponding time dependent IO feature from at least one other storage system, wherein calibrating the time dependent IO feature includes normalizing the coefficient for the time dependent IO feature for the storage system relative to the time dependent IO feature from at least one other storage system, and to process the calibrated time dependent IO feature for the storage system using a machine learning model trained using training data associated with the at least one other storage system.

18. The computing system of claim 17, wherein processing the plurality of IO requests associated with the storage object includes processing a plurality of IO requests from a standard benchmark defining a plurality of standard IO requests for processing on a plurality of storage systems.

19. The computing system of claim 17, wherein the processor is further configured to:
   identify a time independent feature from the plurality of IO features.

20. The computing system of claim 17, wherein the time dependent feature includes one or more of:
   an IO rate feature; and
   an IO interval feature.

* * * * *